United States Patent
Chen et al.

[11] Patent Number: 6,158,416
[45] Date of Patent: Dec. 12, 2000

[54] REDUCED EMISSIONS ELEVATED ALTITUDE SPEED CONTROL FOR DIESEL ENGINES

[75] Inventors: Gong Chen, Erie, Pa.; Bertrand Dahung Hsu, San Jose, Calif.

[73] Assignee: General Electric Company, Schenectady, N.Y.

[21] Appl. No.: 09/389,743

[22] Filed: Sep. 7, 1999

Related U.S. Application Data

[60] Provisional application No. 60/108,532, Nov. 16, 1998.

[51] Int. Cl.[7] ........................................... F02D 7/00
[52] U.S. Cl. .......................................... 123/380; 123/465
[58] Field of Search ....................... 123/380, 465

[56] References Cited

U.S. PATENT DOCUMENTS

| | | | |
|---|---|---|---|
| 4,037,575 | 7/1977 | Sommars | 123/380 |
| 4,384,560 | 5/1983 | Jager et al. | 123/380 |
| 5,086,739 | 2/1992 | Frankle | 123/380 |
| 5,144,926 | 9/1992 | Kato | 123/380 |
| 5,532,930 | 7/1996 | Kako | 123/380 |

FOREIGN PATENT DOCUMENTS

| | | | |
|---|---|---|---|
| 58-133429 | 8/1983 | Japan | 123/380 |

*Primary Examiner*—Erick Solis
*Attorney, Agent, or Firm*—Jill Breedlove; Carl Rowold

[57] ABSTRACT

A diesel engine includes a fuel injection control system communicating with a barometric pressure sensor and throttle position sensor. An elevation compensation controller adjusts engine speed and fuel injection timing at high altitudes in response to the sensed barometric pressure and engine throttle position. Engine speed is increased or decreased by predetermined values with changes in barometric pressure and throttle position to optimize engine performance and efficiency under various pressure conditions while reducing exhaust emissions.

20 Claims, 4 Drawing Sheets

REDUCED EMISSIONS ELEVATED ALTITUDE SPEED CONTROL FOR DIESEL ENGINES

CROSS-REFERENCE TO RELATED APPLICATIONS

This application claims the benefit of U.S. provisional application No. 60/108,532, filed Nov. 16, 1998.

BACKGROUND OF THE INVENTION

This invention relates generally to diesel engines and, more particularly, to medium speed diesel engines for operation at high altitudes.

In a diesel engine, liquid fuel is injected into a plurality of engine cylinders full of compressed air at high temperature. The fuel is broken up into droplets, which evaporate and mix with the air in the cylinders to form a flammable mixture. Since proper combustion in the cylinders requires full oxidation of fuel though evaporation, species diffusion, and mixing with air, the amount of cylinder-charged air, or air to fuel ratio of the mixture plays an important role in diesel engine fuel-air mixing and combustion, which, in turn, affects fuel efficiency and exhaust emissions. This is particularly true for quiescent chamber-type medium speed heavy-duty diesel engines where the cylinder air intake swirling is slight, such as locomotive or marine type engines having cylinders with relatively large displacement volumes. The fuel injection timing of medium speed diesel engines at full load is typically set so that the peak firing pressure in the cylinders is at or below a maximum cylinder firing pressure under normal altitude operation, i.e., at about sea level.

Engine exhaust emissions, including carbon monoxide (CO), particulate matters (PM) and smoke, are generated when the air-fuel mixture is incompletely combusted. When engines are operated at higher altitudes, i.e., at a low barometric pressure, lesser amounts of air are introduced into the cylinders, causing the air-fuel mixing process to deteriorate relative to lower altitude, higher ambient pressure environments. This combination of factors increases untimely and incomplete combustion in the engine cylinders which lowers fuel efficiency and increases exhaust emissions of CO, PM, and smoke. The reduced amount of air for the fuel-air mixture combustion, together with the increased untimely combustion, typically leads to increased cylinder exhaust gas temperatures. For engines including a turbocharger, the decreased barometric pressure and the increased exhaust temperature cause an increase in turbocharger speed. This usually requires power duration to prevent turbocharger damage from overheating and excessive speed.

Accordingly, it would be desirable to operate a diesel engine in a manner that avoids the resultant increase in exhaust emissions while operating at higher altitudes. Additionally, it would be desirable if a diesel engine could be operated at high altitudes with minimal deterioration of engine efficiency and power capacity, and without sacrificing the engine performance at normal altitude operation.

BRIEF SUMMARY OF THE INVENTION

In an exemplary embodiment of the invention, a control system for a diesel engine includes at least one fuel injection pump and at least one fuel injector connected to at least one engine cylinder, an elevation compensation controller, at least one throttle position sensor, and a barometric pressure sensor. The barometric pressure sensor is in fluid communication with the engine air supply, or the air surrounding the engine, and is coupled to the elevation compensation controller. The throttle position sensor is also coupled to the elevation compensation controller, and further supplies a feedback signal to the engine through a loading device mechanically coupled to the engine, such as an alternator, for the desired engine power corresponding to a throttle input or throttle position for the engine. The barometric pressure sensor supplies a pressure signal to the elevation compensation controller, which then adjusts the engine speed to increase or decrease engine speed in response to the sensed barometric pressure and desired engine power corresponding to the throttle position.

The engine speed adjustment alters the air-fuel ratio in the cylinders to avoid incomplete and untimely combustion caused by the change in the air supply pressure, i.e., by a change in barometric pressure. The adjusted engine speed produces more complete and timely combustion in the cylinders, and hence reduces exhaust emissions of CO, PM and smoke when the engine is operated at higher altitudes. The increased air-fuel ratio due to the speed increase at the corresponding engine power level generally lowers the cylinder combustion temperature, which reduces nitrogen oxide ($NO_x$) exhaust emission and/or deterioration of $NO_x$ emission.

In another aspect of the invention, the elevation compensation controller includes a fuel injection timing control module that allows for cooperative engine speed control and fuel injection timing control to further maintain optimum engine performance at reduced exhaust emission levels.

The controller includes electronic controls known in the art, such as a microprocessor, which stores into a memory a table or tables of predetermined engine speed values and fuel injection timing values that minimize exhaust emissions and optimize steady state operation of the engine. The table(s) contain an engine speed value corresponding to pressure conditions sensed by the barometric pressure sensor and throttle position sensed by the throttle position sensor. The tables further contain fuel injection timing values corresponding to pressure conditions sensed by the barometric pressure sensor, selected engine speed, and the engine power, which is represented by the amount of fuel required to maintain the desired engine speed and power. The engine speed values and injection timing values are predetermined not to exceed a maximum peak firing pressure in the engine cylinders under the corresponding pressure and load conditions.

Thus, using the above-described control system, a diesel engine may be continuously operated under varying pressure conditions while minimizing exhaust emissions and maintaining optimum engine performance.

DETAILED DESCRIPTION OF THE INVENTION

Figure 1:
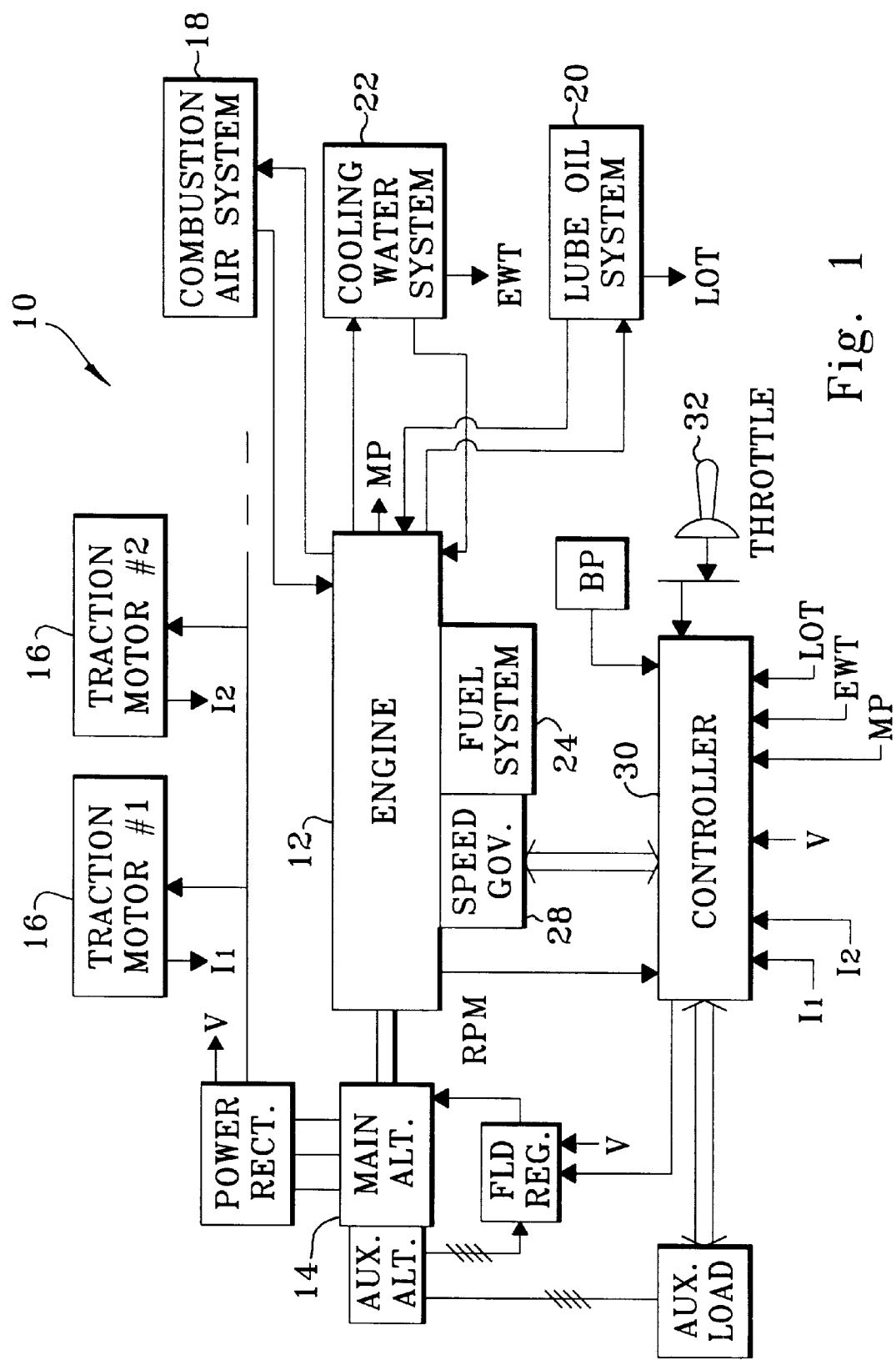
FIG. 1 is a schematic diagram of a diesel engine system.

FIG. 1 is a schematic illustration of a propulsion system 10 including a diesel engine 12. Particularly, and in an exemplary embodiment, system 10 is a self propelled locomotive (not shown). Engine 12 is mechanically coupled to a rotor of a main alternator 14 to power a plurality of traction motors 16 that are positioned on each side of an axle (not shown) of the locomotive to propel the locomotive. While the present invention is described in the context of a locomotive, it is recognized that the benefits of the invention accrue to other applications of diesel engines, and to other varieties of diesel engines beyond that specifically described. Therefore, this embodiment of the invention is intended solely for illustrative purposes and is in no way intended to limit the scope of application of the invention.

Engine 12 is a high horsepower, turbocharged, multiple-cylinder diesel engine, and includes a number of ancillary systems, such as a combustion air system 18, a lube oil system 20, a cooling water system 22, and a fuel system 24. Combustion air system 18 includes an engine exhaust gas-driven turbocharger (not shown in FIG. 1) for compressing air in a combustion air manifold of engine 12. Lube oil system 20 includes an oil pump and associated piping (not shown in FIG. 1) for supplying suitable lubricating oil to the various moving parts of engine 12. Cooling water system 22 includes a pump (not shown in FIG. 1) for circulating relatively cool water from one or more air cooled radiators (not shown in FIG. 1) to a lube oil cooler (not shown in FIG. 1), to a plurality of cylinder liners (not shown in FIG. 1) of engine 12 for absorbing heat generated in the combustion process, and also to one or more "intercoolers" (not shown in FIG. 1) through which combustion air passes after being compressed, and therefore heated, by the turbocharger.

Fuel system 24 includes a fuel tank (not shown in FIG. 1), fuel injection pumps (not shown in FIG. 1), and fuel injector nozzles (not shown in FIG. 1) for injecting diesel fuel into a plurality of power cylinders (not shown in FIG. 1). A fuel pump controller 28 controls the start of and duration of fuel flow into each of the cylinders. In a mechanically fuel injected engine, controller 28 is a governor controller linked to fuel injection pump racks (not shown in FIG. 1) to control the start of and duration of fuel flow into an engine cylinder upon each actuation of the respective fuel injectors. In an electronically fuel injected engine, the controller is an electronic controller connected to electrically actuated valves in the fuel pump to control when and for how long fuel flows into a cylinder upon actuation of an associated fuel injector. Controller 28 regulates engine speed by minimizing any difference between a desired speed and an actual operating speed. The desired speed is set by a variable speed control signal received from an engine controller 30 in response to a manually or automatically selected position or input of a throttle 32 according to defined speed-load schedules.

Figure 2:
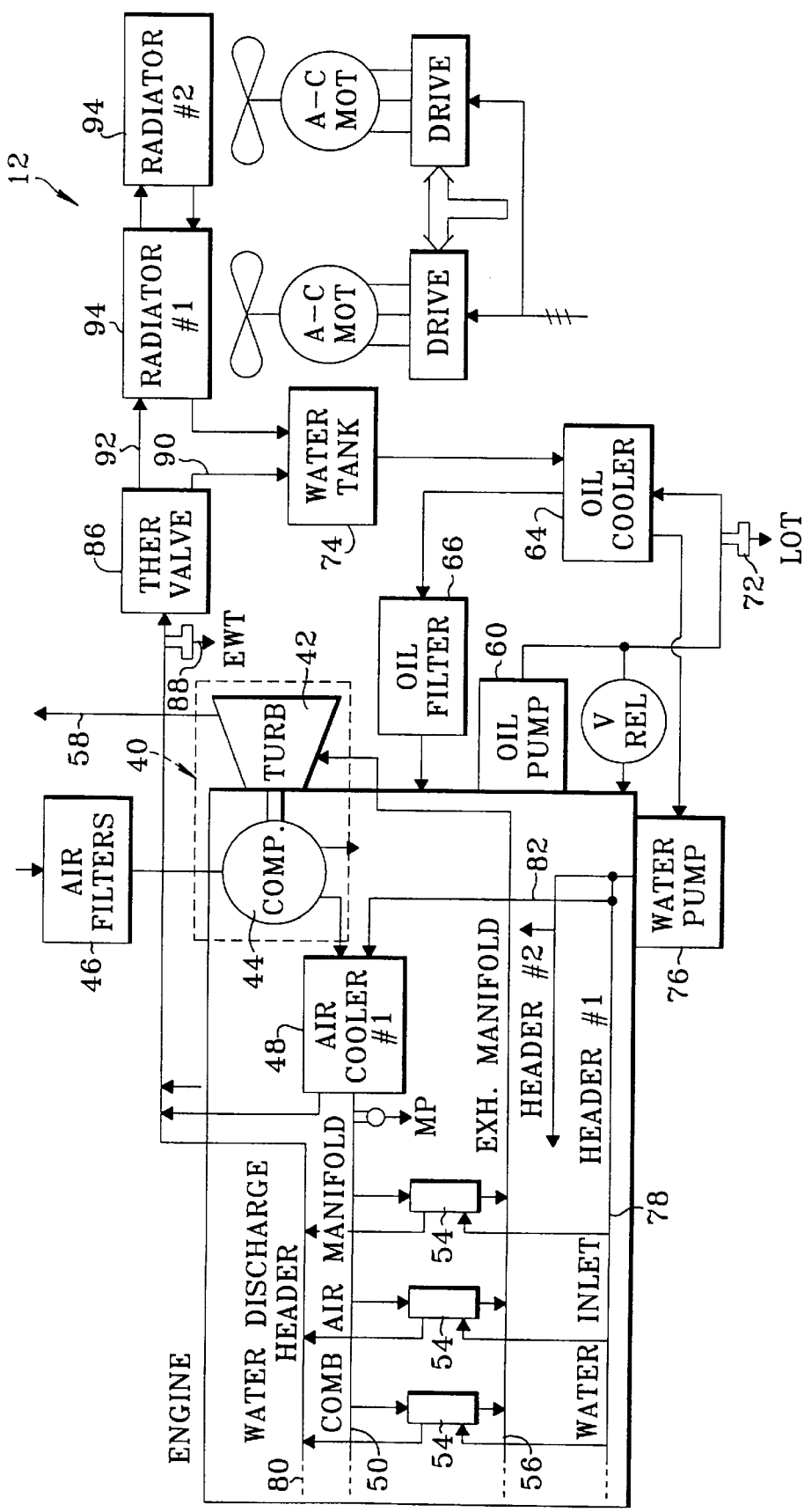
FIG. 2 is a simplified schematic diagram of the engine shown in FIG. 1.

FIG. 2 is a schematic illustration of exemplary diesel engine 12. A turbocharger 40 in combustion air system 18 (FIG. 1) includes a turbine 42, the output of which drives a centrifugal air compressor 44. Clean air is collected in a plenum (not shown in FIG. 2), passed through an array of air filters 46, and delivered to a central inlet of compressor 44 and discharged from compressor 44 at elevated temperature and pressure to an air-water heat exchanger 48 known as an aftercooler or intercooler. From intercooler 48, compressed air passes into a combustion air manifold 50. Compressed air is supplied to power cylinders 54 from combustion air manifold 50.

Gases produced during combustion are exhausted from each of the power cylinders into an exhaust manifold 56. The exhaust gases drive the rotor of turbine 42 prior to their discharge through an exhaust stack 58 to the atmosphere. Turbine 42 speed typically increases as engine 12 develops more power. With engine running at or near full power, compressor 44 compresses combustion air to more than twice atmospheric pressure. One or more intercoolers 48 lower the temperature of the compressed air (which was heated appreciably during the compression process), thereby enlarging the amount of air charge by filling the cylinders with higher density air and lowering the thermal loading of engine 12.

Hot engine oil is pumped by an oil pump 60 to an inlet of an oil-water heat exchanger 64, and cooled oil flows from oil-water heat exchanger 64 through an oil filter 66 and to an oil supply header (not shown in FIG. 2). Oil is distributed from the supply header to various bearings, valves, pistons, gears, and other moving parts (not shown in FIG. 2) of engine 12 for lubricating and/or cooling purposes. A thermistor 72 is exposed to oil flowing in pipe 62 near an inlet of the oil cooler.

Cooling water system 22 comprises a water storage tank 74 from which relatively cool water flows, via heat exchanger tubes inside oil cooler 64, to a water pump 76. Water pump 76 raises the pressure of the water which flows through cylinder jackets of cylinders 54 to a common water discharge header 80. Cooling water is also pumped through intercooler 48 (not shown) to extract heat from the elevated temperature combustion air discharged from compressor 44. The system is balanced hydraulically so that the flow rate to one or more intercoolers is in a desired flow rate to the cylinder jackets.

Hot water leaving the engine from discharge header 80 flows through at least one fluid valve 86. Fluid valve 86 is typically coupled to a thermistor that diverts water to water storage tank 74 when the temperature of the water in valve 86 is below a predetermined temperature or when the water pressure is below a predetermined pressure. When cooling water is above a predetermined temperature, or above a predetermined pressure, water flows into one or more water-air heat exchangers, or radiators 94. After being cooled in radiators 94, water is discharged into water tank 74.

Figure 3:
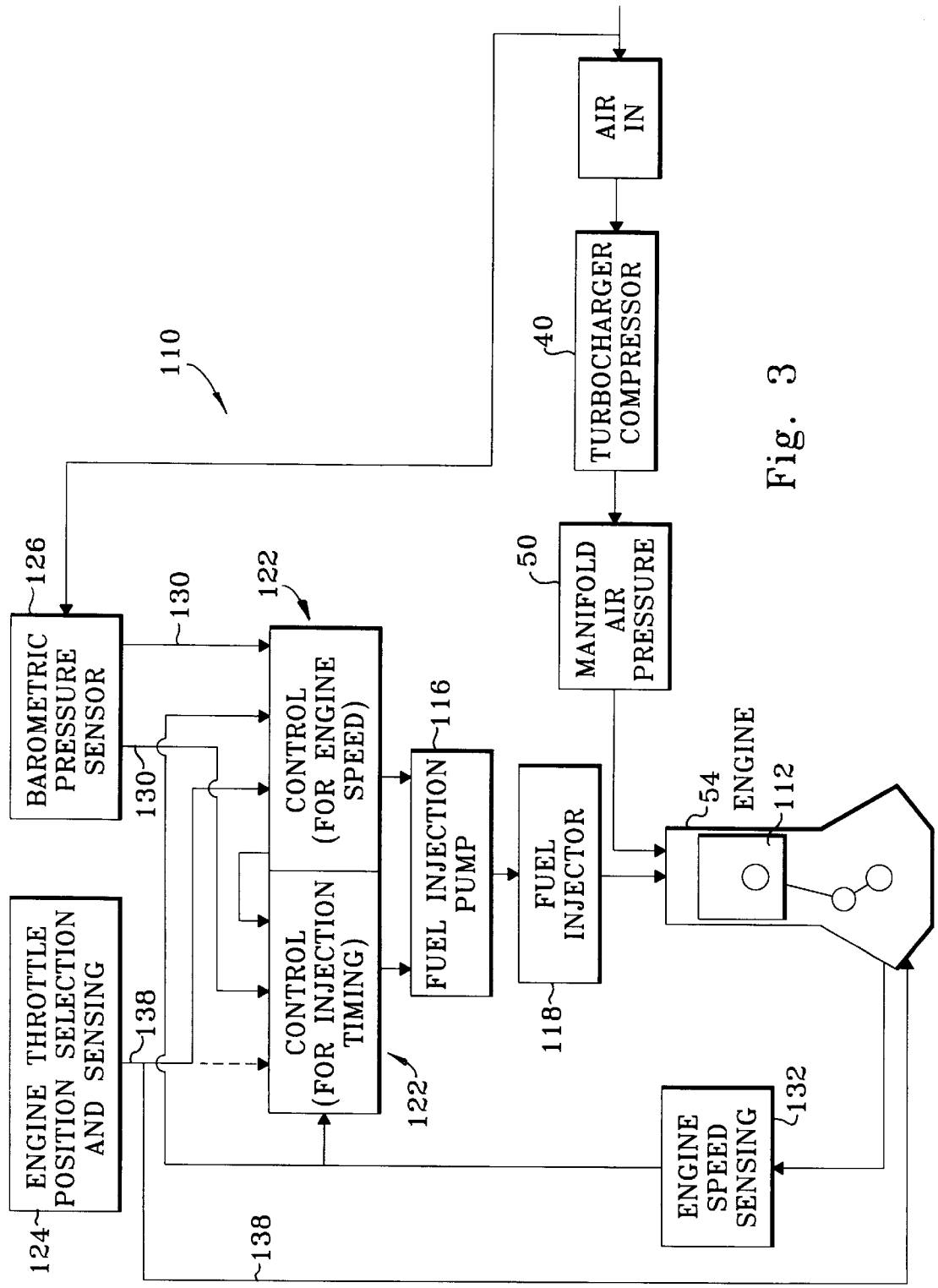
FIG. 3 is a schematic diagram of a control system for the engine shown FIG. 2.

FIG. 3 schematically illustrates a control system 110 for exemplary engine 12 (FIG. 2) including at least one piston 112 operating in at least one cylinder 54. While all the engine cylinders 54 and pistons 112 will typically be encompassed by control system 110, only one piston 112 and cylinder 54 are shown in FIG. 3 for the sake of illustration. A fuel injection pump 116 and a fuel injector 118 are operable to inject fuel into each cylinder 54 for combustion to produce energy for driving pistons 112 in a downward direction. As the fuel is injected, it is mixed with cylinder-compressed air in each cylinder 54 supplied by combustion air manifold 50 and turbocharger 40. Air is supplied to turbocharger 40 through an appropriate air intake unit (not shown) that includes air filters 46 (FIG. 2) to filter particulate matter from the air.

Fuel injection pump 116 and fuel injector 118 are controlled by a elevation compensation controller 122 to control fuel injection timing, i.e., when fuel injection into cylinders 54 begins, and engine speed, i.e., the volume of fuel injected at each actuation of fuel injector 116 with changes in barometric pressure. Elevation compensation controller 122 is integral with controller 28 (shown in FIG. 1), a discrete component of engine controller 30 (shown in FIG. 1), or a separate controller operating cooperatively with controllers 28 and 20. Elevation compensation controller 122, by altering engine speed and/or fuel injection timing at the corresponding engine load and throttle input or throttle position, reduces exhaust emissions and/or increases engine efficiency at higher altitudes, i.e., at low barometric pressure.

At least one throttle position sensor 124 is connected to engine 12 and to an engine input, such as throttle 32 (FIG. 1), to assess the selected engine throttle position. Throttle position signal 138 is supplied to a loading device, such as an alternator (not shown) mechanically coupled to the engine to generate a desired engine power corresponding to the selected throttle position. More specifically, and in a particular embodiment, actual engine speed is monitored by a speed sensor 132 according to known methods, typically by using the timing signals generated by a timing signal generator (not shown) coupled to the engine crankshaft (not shown) or camshaft (not shown). Elevation compensation controller 122 controls engine speed and/or fuel injection timing by operating fuel injection pump 116 to deliver the appropriate volume of fuel into cylinders 54 at each fuel injection cycle, to compare actual engine speed with a desired engine speed determined by throttle position and barometric pressure, and to maintain the corresponding engine speed and power desired. Operation of engine 12 is adjusted by elevation compensation controller 122 utilizing feedback control signals according to known methods to ensure safe operation of engine 12 and to ensure that a desired state of engine operation is achieved.

A barometric pressure sensor 126 is coupled to controller 122 and positioned to reliably sense a barometric pressure of the engine air supply, i.e., the air surrounding the engine, at a location free from turbulence or pressure effects due to engine operation. A barometric pressure sensor signal 130 is supplied to elevation compensation controller 122 from barometric pressure sensor 126 for adjusting operation of fuel injection pump 116 and fuel injector 118 to reduce exhaust emissions, enhance engine efficiency, and maintain engine power capacity at higher altitudes. Elevation compensation controller 122 includes a microcomputer (not shown) and electronic controls (not shown) known in that art.

Barometric pressure of the engine air supply is monitored by control system 110 to distinguish high altitude from normal altitude operation, and elevation compensation controller 122 adjusts engine speed as a function of changes in barometric pressure and throttle position to compensate for reduced cylinder air to fuel ratio at elevated altitudes. Therefore, exhaust emissions can be reduced, and engine performance comparable to normal altitude performance is achieved.

Engine air supply barometric pressure is sensed by barometric pressure sensor 126 and supplied to elevation compensation controller 122. When the barometric pressure decreases or drops, indicating a high altitude, elevation compensation controller 122 increases engine speed by increasing the amount of fuel injected into cylinders 54 at each piston cycle according to a predetermined value stored in a memory (not shown) of elevation compensation controller 122 to minimize exhaust emissions at the corresponding barometric pressure. Elevation compensation controller 122 adjusts the volume of fuel injected at each piston cycle until the actual engine speed reaches a steady state at the desired engine speed to minimize exhaust emissions. The increased engine speed typically causes fuel injection pressure to be higher, the volume of fuel injected at each piston cycle to be lower, and turbocharger rotation to be faster relative to engine operation for the same load at a lower engine speed. Thus, the air-fuel ratio is increased and the duration of fuel injection is shortened. Untimely and incomplete combustion is therefore lower, and exhaust emissions are reduced.

If barometric pressure increases, elevation compensation controller 122 reduces engine speed by decreasing the amount of fuel injected into cylinders at each piston cycle according to a predetermined value stored in a memory (not shown) of controller 122 to optimize steady-state engine efficiency and to minimize exhaust emissions at the corresponding barometric pressure. Thus, engine 12 may be operated continuously and optimally in varying pressure conditions. One or more throttle position sensors 124 monitor throttle position or input, and corresponding signals are supplied to elevation compensation controller 122 for processing to ensure that a damaging engine speed increase will not be implemented.

Engine speed is adjusted either continuously as barometric pressure changes or in steps with specified increases or decreases in barometric pressure. For example, when barometric pressure change exceeds a step interval of two pressure units, speed of engine 12 (FIG. 2) is altered by a predetermined number of rpm. When elevation compensation controller 122 changes the speed of engine 12, a new engine speed is selected, based on the sensed pressure from the barometric pressure sensor 126 and the throttle position signals from throttle position sensor(s) 124, from a table, or tables, of engine specific predetermined engine speed values stored in the memory of elevation compensation controller 122. Each of the engine speed values stored in the look-up table(s) are predetermined to minimize exhaust emissions and/or optimize engine efficiency, prevent a maximum peak allowable firing pressure of cylinders from being exceeded, and prevent turbocharger 40 overspeed at the specified barometric pressure and engine throttle position conditions.

In one particular embodiment, elevation compensation controller 122 also combines engine speed control with fuel injection timing control to advance or retard fuel injection timing as a function of changes in barometric pressure, the volume of fuel required to be injected to maintain the desired engine speed and power at a particular throttle position, and engine speed to compensate for increased incomplete and untimely combustion at elevated altitudes, thereby reducing exhaust emissions and optimizing fuel efficiency. Barometric pressure is sensed with barometric pressure sensor 126. Barometric pressure signal 130 is supplied to elevation compensation controller 122, which selects a predetermined fuel injection timing sequence to maintain an optimum combustion and heat release efficiency in cylinders 54 for the corresponding engine load while reducing exhaust emissions.

If a low barometric pressure representing a high altitude is detected, fuel injection timing is advanced, i.e., fuel injection starts at an earlier point in time in the piston cycle, according to a predetermined value selected from a table, or tables, of fuel injection timing values stored in memory of controller 122 and corresponding to the sensed barometric pressure determined by barometric pressure sensor 126, engine speed, and the demanded engine power or amount of fuel injected at each piston cycle that is required to maintain the desired engine speed and power. It is recognized that the amount of fuel required to maintain a desired engine speed and power is but one representation of the engine load that may be used to select a fuel injection timing value together with barometric pressure and engine speed. For example, engine load could be derived from throttle position.

Each of the stored values minimize exhaust emissions and optimize engine efficiency while preventing cylinder pressures above allowable peak firing pressure in cylinders 54. By advancing fuel injection timing by the predetermined value, peak firing pressure in cylinders 54 is increased to be closer to the maximum allowable peak firing pressure of cylinders 54 during high engine loads at higher altitudes.

Also, as a result of the fuel injection timing being advanced, the air-fuel mixing is prolonged to allow a more complete and timely combustion with an improved timeliness of heat release. Further, as untimely and late combustion is reduced, exhaust emission temperatures are reduced. Consequently, the speed of turbocharger 40 is reduced and the need for power deration to prevent turbocharger damage is minimized.

As barometric pressure changes, elevation compensation controller 122 adjusts fuel injection timing accordingly so that engine 12 may be continuously operated under different pressure conditions with minimal deterioration of engine performance. Thus, fuel injection timing is advanced from normal altitude values during high elevation operation, and retarded or returned to normal altitude values when engine 12 is returned to normal altitude. Of course, the same principles can be applied to operate engine 12 and maintain peak firing pressure at or below the maximum allowable peak firing pressure of cylinders 54 when operating an engine below sea level. Fuel injection timing can be adjusted by elevation compensation controller 122 either continuously with changes in sensed barometric pressure, or in steps with specified levels of pressure change. For example, elevation compensation controller 122 may adjust fuel injection timing when barometric pressure increases or decreases by two pressure units from a given operating pressure.

At lower engine loads in high altitude operation, fuel injection timing and engine speed are adjusted by elevation compensation controller 122 to optimize steady state operation of engine 12. More specifically, advancing the fuel injection timing and increasing engine speed has significant benefits at lower engine loads because turbocharger 40 is relatively sluggish. When the engine operates under partial load, the turbocharger turbine 42 (shown in FIG. 2) rotates slower than when engine 12 operates at full load. Consequently, turbocharger turbine 42 (FIG. 2) does not rotate as fast, so less pressure is developed in cylinders 54 and the deterioration of exhaust emissions is more pronounced. Because of the relatively low cylinder firing pressure at lower engine loads, exceeding a maximum firing pressure by adjusting the fuel injection timing advance and engine speed is of little practical concern. Thus, the injection timing and engine speed can be freely set for optimum emissions and/or fuel efficiency performance for a given barometric pressure and selected throttle position. Based on the sensed barometric pressure, elevation compensation controller 122 selects fuel injection timing values from predetermined values stored in elevation compensation controller memory and found to achieve optimum fuel efficiency and/or emissions reductions without exceeding maximum peak allowable firing pressure in cylinders 54 for a given engine speed and engine load.

Figure 4:
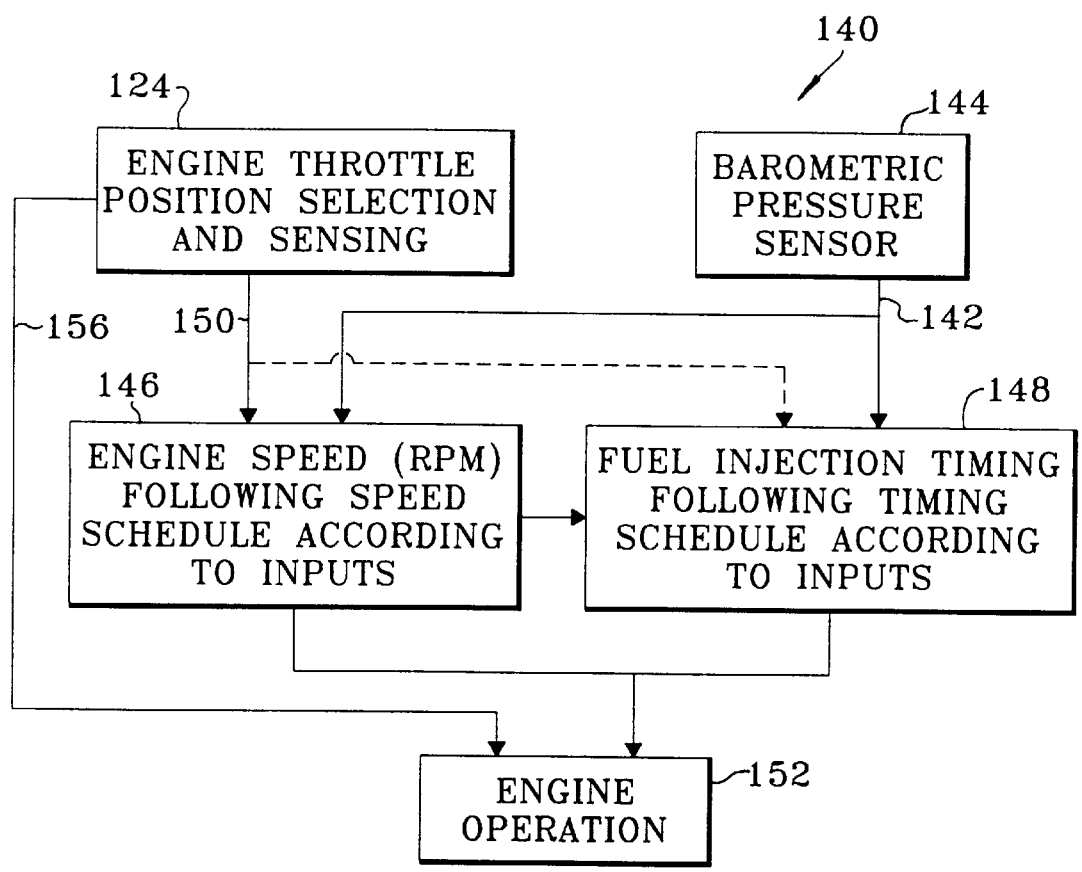
FIG. 4 is a schematic diagram of a control scheme for the control system shown in FIG. 3.

FIG. 4 schematically illustrates a control scheme 140 for elevation compensation controller 122. Barometric pressure signal 142 is supplied by barometric pressure sensor 144 to an engine speed control module 146 and to a fuel injection timing control module 148 of elevation compensation controller 122. Speed control module 146 and timing control module 148 may be integrated into one controller, discrete components of a control unit, or separate controllers coupled to one another and operating cooperatively.

Throttle position signals 150 are supplied to speed control module 146, or to both speed control module 146 and fuel injection timing control module 148. Engine speed control module 146 selects an optimal engine speed based upon barometric pressure signal 142 and throttle position signals 150 and adjusts engine speed accordingly. Throttle position signals 156 are also supplied to engine 152 with a loading device such as an alternator (not shown) mechanically coupled to engine 152 to generate a desired engine power corresponding to the selected throttle position. Engine speed is monitored and corresponding feedback signals (not shown) are supplied to compare the desired engine speed to control the volume of fuel injected into cylinders 54 at each piston cycle to achieve steady state engine operation at the desired engine speed.

While engine speed control module 146 regulates engine speed, fuel injection timing control module 148 selects an optimal fuel injection timing value based upon barometric pressure signal 142, selected engine speed supplied by engine speed control module 146, and the amount of fuel injected at each piston cycle to maintain the desired speed and engine power corresponding to the selected throttle position. Engine conditions, including actual engine speed are monitored. By comparing actual engine speed to the desired engine speed, controller 122 (FIG. 3) adjusts the volume of fuel injected at each piston cycle to achieve steady state engine operation at the desired fuel injection timing.

Therefore, diesel engine control is provided that avoids increased exhaust emissions in high altitude operation with minimal deterioration of engine efficiency and power capacity, and without sacrificing the engine performance at normal altitude operation.

While the invention has been described in terms of various specific embodiments, those skilled in the art will recognize that the invention can be practiced with modification within the spirit and scope of the claims.

What is claimed is:

1. A control system for a diesel engine including at least one power cylinder, a fuel injection pump, and a fuel injector connected to the fuel pump for injecting fuel into the at least one cylinder, said control system comprising:

an elevation compensation controller coupled to the fuel injection pump and to the fuel injector for regulating an engine speed; and at least one barometric pressure sensor coupled to said controller, said elevation compensation controller adjusting the engine speed in response to an barometric pressure signal from said barometric pressure sensor.

2. A control system in accordance with claim 1 wherein said elevation compensation controller comprises an engine speed control module and a fuel injection timing control module, said engine speed control module adjusting the engine speed.

3. A control system in accordance with claim 2 wherein said speed control module and said fuel injection timing control module are integrated.

4. A control system in accordance with claim 2 wherein said barometric pressure sensor is coupled to both said speed control module and to said fuel injection timing control module.

5. A control system in accordance with claim 4 wherein the engine includes a throttle input selectively operable between a plurality of throttle positions, said control system further comprising at least one throttle position sensor coupled to said engine speed control module and connected to the throttle input for sensing the throttle position, said engine speed control module operating said fuel injection pump and the fuel injector in response to said at least one throttle position sensor.

6. A control system in accordance with claim 5 wherein said engine speed control module comprises a microprocessor and a memory, said memory loaded with predetermined engine speed values for a range of barometric pressures and throttle positions.

7. A control system in accordance with claim 4 wherein said elevation compensation controller is coupled to the fuel injection pump and fuel injector for regulating fuel injection timing, said fuel injection timing control module adjusting said fuel injection timing in response to said barometric pressure signal.

8. A control system in accordance with claim 7 wherein said fuel injection timing control module comprises a microprocessor and a memory, said memory loaded with predetermined fuel injection timing values for a range of barometric pressures and engine speeds.

9. A control system for a diesel engine including a plurality of power cylinders and a fuel injection system coupled to said plurality of power cylinders for injecting fuel into said power cylinders; said control system comprising:
   an engine speed control module;
   a fuel injection timing control module coupled to said engine speed control module;
   a throttle position sensor system coupled to said engine speed control module;
   a barometric pressure sensor coupled to said engine speed control module and to said fuel injection timing control module for adjustment of engine speed and fuel injection timing in response to changes in barometric pressure.

10. A fuel injected diesel engine in accordance with claim 9 wherein said engine speed control module comprises a microprocessor and a memory, said memory including engine speed values corresponding to a range of barometric pressures and throttle positions.

11. A fuel injected diesel engine in accordance with claim 10 wherein fuel injection timing control module comprises a microprocessor and a memory, said memory including fuel injection timing values based on engine speed, barometric pressure, and engine power.

12. A method for controlling a fuel injected diesel engine including at least one power cylinder, a combustion air system for introducing combustion air to the at least one power cylinder, a fuel injection system for regulating an engine speed by controlling the volume of fuel injected into the at least one cylinder, a barometric pressure sensor, and at least one throttle position sensor, said method comprising the steps of:

sensing a barometric pressure of an engine air supply;
   sensing a throttle position; and
   adjusting the engine speed in response to the sensed pressure and the sensed throttle input.

13. A method in accordance with claim 12 wherein the step of adjusting the engine speed comprises the steps of increasing the engine speed when the sensed pressure drops, and decreasing engine speed when the sensed pressure rises.

14. A method in accordance with claim 12 wherein the fuel injection system includes an elevation compensation controller having a microprocessor and a memory, said step of adjusting the engine speed further comprising the steps of:
   selecting a predetermined engine speed value from controller memory corresponding to the sensed pressure and sensed throttle position; and
   setting the engine speed accordingly.

15. A method in accordance with claim 14 further comprising the step of adjusting the fuel injection timing in response to the sensed barometric pressure and the engine speed.

16. A method in accordance with claim 15 wherein adjusting the fuel injection timing comprises the step of selecting a fuel injection timing value stored in said controller memory based on barometric pressure, engine speed, and engine power.

17. A method in accordance with claim 12 wherein adjusting the engine speed comprises the step of continuously adjusting the engine speed as the barometric pressure changes.

18. A method in accordance with claim 12 wherein adjusting the engine speed comprises the step of adjusting the engine speed in step with a predetermined step change in barometric pressure.

19. A method in accordance with claim 14 wherein said elevation compensation controller memory includes predetermined engine speed values and injection timing values so as to not exceed a maximum peak firing pressure in the cylinders when said fuel ignition timing and engine speed values are implemented under the corresponding barometric pressure, engine speed, and engine load.

20. A method in accordance with claim 19 wherein the drop of peak firing pressure in the cylinders is minimized without exceeding the maximum allowable firing pressure when the engine operates at high load and high altitude.

* * * * *